United States Patent
Kubota et al.

(10) Patent No.: US 10,450,473 B2
(45) Date of Patent: Oct. 22, 2019

(54) NON-AQUEOUS INK JET COMPOSITION

(71) Applicant: Seiko Epson Corporation, Tokyo (JP)

(72) Inventors: Kenichiro Kubota, Matsumoto (JP); Naoki Koike, Matsumoto (JP); Jun Ito, Shimosuwa (JP); Shugo Hattori, Shiojiri (JP)

(73) Assignee: Seiko Epson Corporation (JP)

( * ) Notice: Subject to any disclaimer, the term of this patent is extended or adjusted under 35 U.S.C. 154(b) by 177 days.

(21) Appl. No.: 15/409,870

(22) Filed: Jan. 19, 2017

(65) Prior Publication Data

US 2017/0210923 A1 Jul. 27, 2017

(30) Foreign Application Priority Data

Jan. 27, 2016 (JP) .................. 2016-013520

(51) Int. Cl.
*B41J 2/01* (2006.01)
*C09D 11/36* (2014.01)
(Continued)

(52) U.S. Cl.
CPC ............ *C09D 11/36* (2013.01); *B41J 2/01* (2013.01); *C09D 11/106* (2013.01);
(Continued)

(58) Field of Classification Search
None
See application file for complete search history.

(56) References Cited

U.S. PATENT DOCUMENTS 6,048,390 A * 4/2000 Yano .................. C09D 11/328
106/31.43
6,395,854 B1 * 5/2002 Takeshima ............. C08F 12/22
526/173

(Continued)

FOREIGN PATENT DOCUMENTS

EP 1 790 698 A1 5/2007
JP 2005-290216 A 10/2005
(Continued)

OTHER PUBLICATIONS

Extended European Search Report for Application No. EP 17 15 3179 dated Apr. 21, 2017 (6 pages).

(Continued)

*Primary Examiner* — Erica S Lin
(74) *Attorney, Agent, or Firm* — Harness, Dickey & Pierce, P.L.C.

(57) ABSTRACT

A non-aqueous ink jet composition includes a pigment at least containing a diketopyrrolopyrrole red pigment, and an organic solvent at least containing a glycol diether represented by Formula (1): $R^1O-(R^3O)_m-R^2$ and a glycol monoether represented by Formula (2): $OH-(R^5O)_n-R^4$, wherein, in Formula (1), $R^1$ and $R^2$ each independently represent an alkyl group having 1 to 7 carbon atoms, $R^3$ represents an alkylene group having 1 to 3 carbon atoms, and m represents an integer of 1 to 7; and in Formula (2), $R^4$ represents an alkyl group having 1 to 7 carbon atoms, $R^5$ represents an alkylene group having 1 to 3 carbon atoms, and n represents an integer of 1 to 7.

14 Claims, 1 Drawing Sheet

(51) Int. Cl.
*C09D 11/107* (2014.01)
*C09D 11/322* (2014.01)
*C09D 11/38* (2014.01)
*C09D 11/106* (2014.01)

(52) U.S. Cl.
CPC .......... *C09D 11/107* (2013.01); *C09D 11/322* (2013.01); *C09D 11/38* (2013.01)

(56) References Cited

U.S. PATENT DOCUMENTS

| | | |
|---|---|---|
| 7,806,972 B2 | 10/2010 | Sugita et al. |
| 8,991,996 B2 | 3/2015 | Nagase et al. |
| 2008/0182083 A1* | 7/2008 | Oyanagi ............... C09D 11/322 428/195.1 |
| 2009/0090271 A1 | 4/2009 | Wynants et al. |
| 2009/0235843 A1* | 9/2009 | Sugita ................. C09D 11/322 106/31.58 |
| 2009/0305156 A1* | 12/2009 | Weber ................. C09B 67/0022 430/108.23 |
| 2016/0168405 A1 | 6/2016 | Ito et al. |
| 2016/0237291 A1 | 8/2016 | Nagase et al. |
| 2016/0264805 A1 | 9/2016 | Nagase et al. |

FOREIGN PATENT DOCUMENTS

| | | |
|---|---|---|
| JP | 2006-243588 A | 9/2006 |
| JP | 2009-227812 A | 10/2009 |
| JP | 2014-237803 A | 12/2014 |
| JP | 2016-113531 A | 6/2016 |
| JP | 2016-150985 A | 8/2016 |
| JP | 2016-166311 A | 9/2016 |

OTHER PUBLICATIONS

Extended European Search Report for Application No. EP 18197132.6 dated Feb. 11, 2019 (6 pages).

* cited by examiner

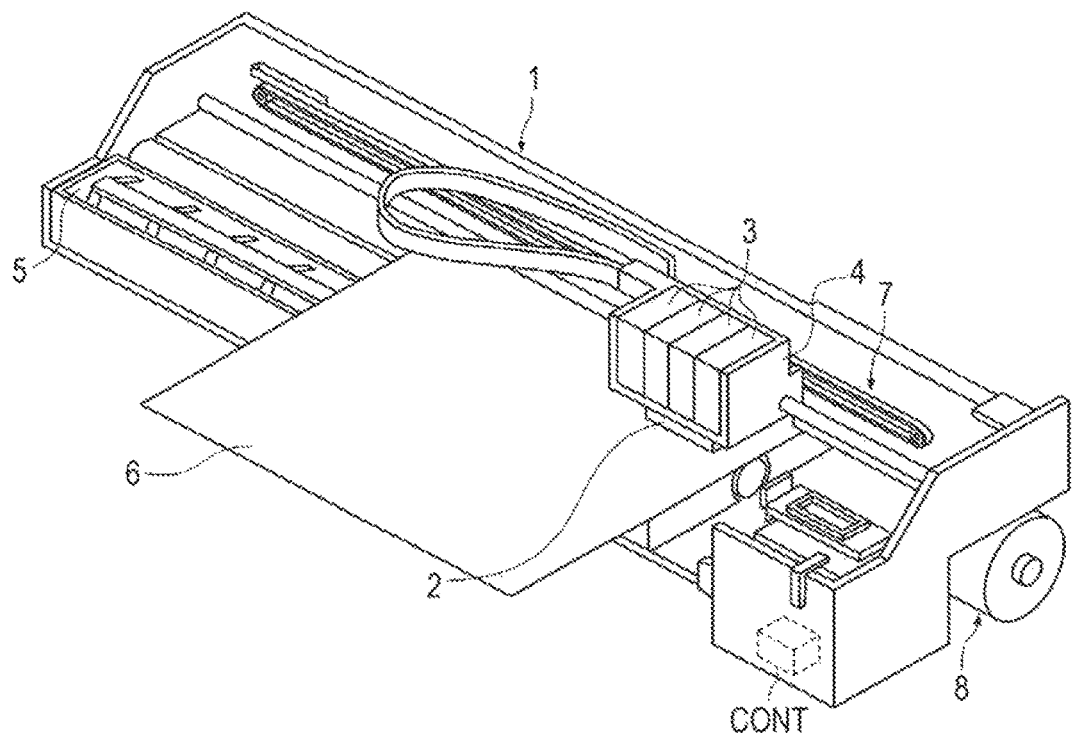

NON-AQUEOUS INK JET COMPOSITION

BACKGROUND

1. Technical Field

The present invention relates to a non-aqueous ink jet composition.

2. Related Art

Ink jet recording methods can record highly fine images with relatively simple apparatuses and have been rapidly developing in various fields. Among them, various studies for more stably giving recorded matters having high quality have been being carried out.

For example, JP-A-2009-227812 (Patent Literature 1) is subjected to provide, in particular, an oil-based ink set that can form images having high color intensity with high color reproducibility and discloses an oil-based ink set including a first oil-based ink, a second oil-based ink, and a third oil-based ink each independently having a wavelength region in which the reflectivity on a recording medium changes from 80% to 5% within a wavelength region range of 400 to 700 nm, wherein the reflectivity of the second oil-based ink is successively higher than that of the first oil-based ink in the wavelength region in which the reflectivity of the first oil-based ink changes from 80% to 5%; the reflectivity of the third oil-based ink is successively higher than that of the second oil-based ink in the wavelength region in which the reflectivity of the second oil-based ink changes from 80% to 5%; and the coloring materials in the first oil-based ink, the second oil-based ink, and the third oil-based ink are different from one another.

However, when the oil-based inks described in Patent Literature 1 are used, in spite of intending to form images having high color intensity, it is impossible to provide recorded matters having excellent intensity at a higher level, due to the pigment species contained in the oil-based inks.

SUMMARY

An advantage of some aspects of the invention is to provide a non-aqueous ink jet composition that can form recorded matters having excellent intensity.

The present inventors have diligently studied to solve the above-described problems and, as a result, have found that recorded matters having excellent intensity can be provided by using a non-aqueous ink jet composition including a pigment at least containing a diketopyrrolopyrrole red pigment and a predetermined organic solvent, and have accomplished the present invention.

That is, the present invention relates to a non-aqueous ink jet composition including a pigment containing a diketopyrrolopyrrole red pigment and an organic solvent containing a glycol diether represented by Formula (1) and a glycol monoether represented by Formula (2):

$$R^1O—(R^3O)_m—R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7,

$$OH—(R^5O)_n—R^4 \quad (2)$$

where, $R^4$ represents an alkyl group having 1 to 7 carbon atoms, $R^5$ represents an alkylene group having 1 to 3 carbon atoms, and n represents an integer of 1 to 7.

The factors of such a non-aqueous ink jet composition of the present invention that can solve the above-described problems are presumed, but not limited to, as follows: Known non-aqueous ink jet compositions do not provide sufficiently excellent intensity to the resulting recorded matters because of occurrence of uneven aggregation in the recorded matters due to the pigment species contained in the compositions. In contrast, the non-aqueous ink jet composition according to the present invention can provide sufficiently excellent intensity to the resulting recorded matter through enhancing the color development of the pigment itself by containing the diketopyrrolopyrrole red pigment and through preventing occurrence of uneven aggregation in the recorded matter by containing the glycol diether and the glycol monoether. Specifically, the ink jet composition can have good dispersion stability and can show a good drying property on a recording medium by containing the glycol diether. As the result of the good drying property, uneven aggregation hardly occurs, which contributes to improvement of intensity. A good wet-spreading property is also required for improving intensity, the ink jet composition can have a good wet-spreading property on a recording medium by containing the glycol monoether. It may be difficult to improve the wet-spreading property by containing only the glycol diether, and it may be difficult to improve the drying property by containing only the glycol monoether. In such a circumstance, the use of both can complete the conflicting characteristics. That is, both the wet-spreading property and the drying property are improved to provide sufficiently excellent intensity to the resulting recorded matter.

In addition, in the non-aqueous ink jet composition according to the present invention, the organic solvent preferably further contains a cyclic lactone. The content of the pigment is preferably 1.0% by mass or more and 5.0% by mass or less based on the total amount of the non-aqueous ink jet composition. Furthermore, in the non-aqueous ink jet composition according to the present invention, the content of the organic solvent is preferably 50% by mass or more and 90% by mass or less based on the total amount of the non-aqueous ink jet composition, and the content of the cyclic lactone is more preferably 5.0% by mass or more and 30% by mass or less based on the total amount of the non-aqueous ink jet composition. The non-aqueous ink jet composition preferably further includes a vinyl chloride resin.

In addition, the ink jet recording method according to the present invention includes a step of performing recording on a recording medium by an ink jet method using the non-aqueous ink jet composition according to the present invention.

BRIEF DESCRIPTION OF THE DRAWINGS

The invention will be described with reference to the accompanying drawing, wherein like numbers reference like elements.

FIG. 1 is a perspective view schematically illustrating the configuration of a printer according to an embodiment of the present invention.

DESCRIPTION OF EXEMPLARY EMBODIMENTS

Aspects (hereinafter, referred to as "embodiments") for implementing the present invention will now be described in detail with reference to the drawing as needed. The following embodiments are examples for explaining the present invention and are not intended to limit the present invention to the following contents. The present invention can be implemented by being appropriately modified within the scope of the gist. In the drawing, the same elements are denoted by the same reference signs, and the duplicated explanation is omitted. The positional relation such as up and down and right and left is based on the positional relation shown in the drawing, unless otherwise specified. The dimensional ratios are not limited to those shown in the drawing.

Non-aqueous Ink Jet Composition

The non-aqueous ink jet composition (hereinafter, also simply referred to as "ink jet composition", "non-aqueous composition", or "composition") according to the embodiment includes a pigment containing a diketopyrrolopyrrole red pigment and an organic solvent. The organic solvent contains a glycol diether represented by Formula (1) (hereinafter, also referred to as "specific glycol diether") and a glycol monoether represented by Formula (2) (hereinafter, also referred to as "specific glycol monoether"):

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7,

$$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

The composition of the embodiment includes the pigment containing a diketopyrrolopyrrole red pigment and also the specific glycol diether and the specific glycol monoether and thereby can provide excellent intensity to recorded matters. The factors for this are presumed (but not limited to) as follows. Known non-aqueous compositions do not provide sufficiently excellent intensity to the resulting recorded matter because of occurrence of uneven aggregation in the recorded matter due to the pigment species contained in the compositions. In contrast, the non-aqueous composition of the embodiment can provide sufficiently excellent intensity to the resulting recorded matter through enhancing the color development of the pigment itself by employing a diketopyrrolopyrrole red pigment and also through preventing occurrence of uneven aggregation in the recorded matter by containing the specific glycol diether and the specific glycol monoether. Specifically, the wet-spreading property of the ink jet composition on a recording medium is mainly improved by containing the glycol monoether, and the drying property of the ink jet composition on a recording medium is also improved by containing the glycol diether. That is, a recorded matter provided with sufficiently excellent intensity is obtained by improving both the wet-spreading property and the drying property.

In addition, even if a known non-aqueous ink composition contains a diketopyrrolopyrrole red pigment, it is difficult to maintain sufficiently good dispersibility of the pigment in the ink composition by merely containing the diketopyrrolopyrrole red pigment. Deterioration in stability of the dispersibility causes occurrence of aggregation, resulting in poor discharge stability. In contrast, the non-aqueous ink composition of the embodiment includes a diketopyrrolopyrrole red pigment and further includes an organic solvent containing a specific glycol diether and a specific glycol monoether. As a result, the non-aqueous ink composition is provided with good dispersion stability, resulting in excellent discharge stability.

In the embodiment, the term "non-aqueous composition" refers to a composition of which the main solvent is of other than water, such as an organic solvent. Herein, the term "main solvent" means that the content of the solvent in the composition is 50% by mass or more, preferably 70% by mass or more, and more preferably 90% by mass or more against 100% by mass of the composition. If the composition contains water, it is preferable that the water is not intentionally added to the composition as a main solvent component in preparation of the composition, and it is preferable that the water is inevitably contained in the composition as an impurity. The content of the water in the composition is preferably 3.0% by mass or less, more preferably 2.0% by mass or less, more preferably 1.0% by mass or less, and further preferably 0.5% by mass or less against 100% by mass of the composition. The lower limit of the content of water is not particularly limited and may be lower than the detection limit or may be 0.01% by mass.

The content of water in the composition can be controlled by, for example, removing water from each component of the composition, specifically, removing water contaminating the organic solvent; removing water from the composition; or preventing water from contaminating the composition during preparation of the composition. Among these methods, the method removing water contaminating the organic solvent is, more specifically, performed by purifying the organic solvent by distillation; applying the organic solvent to a semi-permeable membrane that selectively allows water to permeate; or selectively allowing water contaminating the organic solvent to adsorb to a water adsorbent. Among these methods, from the viewpoint of efficiently and certainly reducing the amount of water, purification by distillation is preferred.

The non-aqueous ink jet composition of the embodiment includes a pigment and an organic solvent described below. Compositions containing solvents are roughly classified into two: a real-solvent (high organic solvent) composition and an eco-solvent (low organic solvent) composition. The eco-solvent composition is a low-odor and human and environment-friendly composition, and the organic solvent contained in the composition does not fall under the category of organic solvents defined by the Industrial Safety and Health Act, does not fall under the categories of Class-1 and Class-2 organic solvents defined by the Ordinance On Prevention of Organic Solvent Poisoning, and does not fall under the category of organic solvents requiring local exhaust ventilation in indoor workplaces defined as the installation environment by the Fire Service Act. Although the solvent contained in the solvent-based composition of the embodiment may be an organic solvent used in a real-solvent composition or an organic solvent used in an eco-solvent composition, an organic solvent that can be used in an eco-solvent composition is preferred.

The "ink jet composition" in the embodiment can be used in a variety of purposes as a composition to be discharged by an ink jet method, and the purposes are not limited. Specifically, the composition is used, for example, as a composition for inks. The composition of the embodiment will now be described in more detail using a case of being used as an ink composition for ink jet recording (hereinafter, also simply referred to as "ink composition"), which in one embodiment of ink jet compositions, but the composition of the embodiment is not limited thereto.

Pigment

The composition of the embodiment may contain any pigment as long as a diketopyrrolopyrrole red pigment is contained, and may contain only a diketopyrrolopyrrole red pigment or may contain a mixture of a diketopyrrolopyrrole red pigment and a pigment other than the diketopyrrolopyrrole red pigment (hereinafter, also referred to as "other pigment").

The diketopyrrolopyrrole red pigment may be any pigment having a diketopyrrolopyrrole skeleton and exhibiting a red color. The diketopyrrolopyrrole skeleton may include a substituent, such as an alkyl group, or may include no substituent (the case that the substituents are all hydrogen atoms). Herein, the term "exhibiting a red color" means that when the pigment is applied to a white recording medium so as to cover the entire surface as an ink jet composition and when the resulting recorded matter is measured by colorimetry using Spectrolino (manufactured by GretagMacbeth), the value h in the L*C*h color space of the CIE standard colorimetric system is −30° to 45°, preferably −30° to 32°, more preferably −30° to 30°, and further preferably −30° to 25°. Examples of the diketopyrrolopyrrole red pigment include, but not limited to, red organic pigments, such as C.I. Pigment Red 254, C.I. Pigment Red 255, C.I. Pigment Red 264, C.I. Pigment Red 270, and C.I. Pigment Red 272. Among these pigments, from the viewpoint of forming recorded matters having more excellent intensity, the organic pigments are preferably C.I. Pigment Red 254, C.I. Pigment Red 255, and C.I. Pigment Red 264, more preferably C.I. Pigment Red 255 and C.I. Pigment Red 254, and most preferably C.I. Pigment Red 254. These diketopyrrolopyrrole red pigments may be used alone or as a mixture of two or more thereof.

The content of the diketopyrrolopyrrole red pigment is not particularly limited and is 30% by mass or more and 100% by mass or less, 50% by mass or more and 100% by mass or less, or 70% by mass or more and 100% by mass or less based on the total amount (100% by mass) of the pigments. The use of a composition containing the diketopyrrolopyrrole red pigment within such a content range tends to improve and give more excellent intensity.

The other pigment may be any pigment other than the diketopyrrolopyrrole red pigment and can be, for example, an inorganic pigment or an organic pigment that is usually used in known non-aqueous ink compositions. These other pigments may be used alone or as a mixture of two or more thereof.

Examples of the organic pigment include, but not limited to, azo pigments (e.g., azo lake, insoluble azo pigments, condensed azo pigments, and chelate azo pigments), polycyclic pigments (e.g., phthalocyanine pigments, perylene and perylene pigments, anthraquinone pigments, quinacridone pigments, dioxadine pigments, thioindigo pigments, isoindolinone pigments, and quinophthalone pigments), dye lakes (e.g., basic dye lakes and acid dyelakes), nitro pigments, nitroso pigments, aniline black, and daylight fluorescent pigments.

Examples of the inorganic pigment include, but not limited to, carbon black, titanium dioxide, silica, and alumina.

It is also preferred to use a red organic pigment other than the diketopyrrolopyrrole red pigment (hereinafter, also referred to as "other red organic pigment") or an orange organic pigment other than the diketopyrrolopyrrole red pigment (hereinafter, also referred to as "other orange organic pigment") as the other pigment, from the viewpoint of discharge stability and abrasion resistance.

Examples of the other red organic pigment include, but not limited to, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 179, C.I. Pigment Red 194, C.I. Pigment Red 209, C.I. Pigment Red 222, and C.I. Pigment Red 224.

Examples of the other orange organic pigment include, but not limited to, C.I. Pigment Orange 31, C.I. Pigment Orange 43, C.I. Pigment Orange 64, C.I. Pigment Orange 71, C.I. Pigment Orange 73, and C.I. Pigment Orange 81.

The content of the pigment is preferably 0.5% by mass or more and 10% by mass or less, more preferably 1.0% by mass or more and 5.0% by mass or less, and further preferably 2.0% by mass or more and 4.0% by mass or less, based on the total amount (100% by mass) of the composition. A content of the pigment of 0.5% by mass or more has a tendency of providing more excellent intensity to the resulting recorded matter, and a content of the pigment of 10% by mass or less has a tendency of providing more excellent abrasion resistance to the resulting recorded matter and providing more excellent discharge stability.

Organic Solvent

The organic solvent of the embodiment is not particularly limited as long as a glycol diether represented by Formula (1) (specific glycol diether) and a glycol monoether represented by Formula (2) (specific glycol monoether) are at least contained:

$$R^1O-(R^3O)_m-R^2 \qquad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7, $$OH-(R^5O)_n-R^4 \qquad (2)$$

where, $R^4$ represents an alkyl group having 1 to 7 carbon atoms, $R^5$ represents an alkylene group having 1 to 3 carbon atoms, and n represents an integer of 1 to 7.

In Formula (1), $R^1$ and $R^2$ each independently preferably represent an alkyl group having 1 to 5 carbon atoms; $R^3$ preferably represents an alkylene group having 2 or 3 carbon atoms; and m preferably represents an integer of 1 to 6. In Formula (2), $R^4$ preferably represents an alkyl group having 1 to 5 carbon atoms; $R^5$ preferably represents an alkylene group having 2 or 3 carbon atoms; and n preferably represents an integer of 1 to 6.

Examples of the specific glycol diether include, but not limited to, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Among these glycol diethers, diethylene glycol ethyl methyl ether, diethylene glycol diethyl ether, and tetraethylene glycol dimethyl ether are preferred; and diethylene glycol ethyl methyl ether is more preferred. The composition containing such a preferable specific glycol diether provides more excellent abrasion resistance to the resulting recorded matter and has a tendency of having more excellent dispersion stability. As the result of improvement in dispersion stability, for example, occurrence of aggregated matter can be prevented to show a tendency of providing more excellent discharge stability. These specific glycol diethers may be used alone or in combination of two or more thereof.

The content of the specific glycol diether is preferably 5.0% by mass or more and 90% by mass or less, more preferably 20% by mass or more and 80% by mass or less, and further preferably 30% by mass or more and 70% by mass or less based on the total amount (100% by mass) of the composition. A content of the specific glycol diether within the above-mentioned range has a tendency of providing more excellent intensity to the resulting recorded matter. Herein, the content of the specific glycol diether in the composition is the content including the amount of the specific glycol diether contained in, for example, a dispersion.

Examples of the specific glycol monoether include, but not limited to, ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether. Among these glycol monoethers, ethylene glycol monobutyl ether, triethylene glycol monobutyl ether, tetraethylene glycol monoethyl ether, and dipropylene glycol monoethyl ether are preferred; and triethylene glycol monobutyl ether is more preferred. The composition containing such a preferable specific glycol monoether provides more excellent abrasion resistance to the resulting recorded matter and has a tendency of having more excellent dispersion stability. These specific glycol monoethers may be used alone or in combination of two or more thereof.

The content of the specific glycol monoether is preferably 5.0% by mass or more and 80% by mass or less, more preferably 10% by mass or more and 60% by mass or less, and further preferably 15% by mass or more and 40% by mass or less based on the total amount (100% by mass) of the composition. A content of the specific glycol monoether within the above-mentioned range has a tendency of providing more excellent intensity to the resulting recorded matter. Herein, the content of the specific glycol monoether in the composition is the content including the amount of the specific glycol monoether contained in, for example, a dispersion.

The total content of the specific glycol diether and the specific glycol monoether is preferably 30% by mass or more and 99.5% by mass or less, more preferably 40% by mass or more and 95% by mass or less, and further preferably 50% by mass or more and 80% by mass or less based on the total amount (100% by mass) of the composition. A total content of the specific glycol diether and the specific glycol monoether within the above-mentioned range has a tendency of providing more excellent intensity to the resulting recorded matter. Herein, the total content of the specific glycol diether and the specific glycol monoether in the composition is the content including the amounts of the specific glycol diether and the specific glycol monoether contained in, for example, a dispersion.

The organic solvent may further contain a glycol diether (hereinafter, also referred to as "other glycol diether") other than the specific glycol diether and/or a glycol monoether (hereinafter, also referred to as "other glycol monoether") other than the specific glycol monoether. Examples of the other glycol diether include heptaethylene glycol dimethyl ether. Examples of the other glycol monoether include heptaethylene glycol monomethyl ether.

The organic solvent further containing a cyclic lactone has a tendency of providing more excellent abrasion resistance to the resulting recorded matter. The cyclic lactone may be any compound having a ring structure formed by ester bonds, and examples thereof include γ-lactone having a five-membered ring structure, δ-lactone having a six-membered ring structure, and ε-lactone having a seven-membered ring structure. Examples of the cyclic lactone include, but not limited to, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam. Among these cyclic lactones, γ-lactone having a five-membered ring structure and δ-lactone having a six-membered ring structure are preferred; γ-butyrolactone, γ-valerolactone, and δ-valerolactone are more preferred; and γ-butyrolactone is further preferred. The composition containing such a cyclic lactone has a tendency of further enhancing the abrasion resistance. The cyclic lactones may be used alone or in combination of two or more thereof.

The content of the cyclic lactone is preferably 1.0% by mass or more and 50% by mass or less, more preferably 3.0% by mass or more and 40% by mass or less, and further preferably 5.0% by mass or more and 30% by mass or less based on the total amount (100% by mass) of the composition. A content of the cyclic lactone of 1.0% by mass or more has a tendency of providing more excellent abrasion resistance. A content of the cyclic lactone of 50% by mass or less has a tendency of providing more excellent intensity. Herein, the content of the cyclic lactone in the composition is the content including the amount of the cyclic lactone contained in, for example, a dispersion.

The content of the organic solvent is preferably 35% by mass or more and 95% by mass or less, more preferably 50% by mass or more and 90% by mass or less, and further preferably 60% by mass or more and 90% by mass or less based on the total amount (100% by mass) of the composition. Herein, the content of the organic solvent in the composition is the content including the amount of the organic solvent contained in, for example, a dispersion.

Resin

The composition of the embodiment may further contain a resin for adjusting the viscosity of the composition as a main purpose. Examples of the resin include, but not limited to, acrylic resins, styrene acrylic resins, rosin-modified resins, phenolic resins, terpene resins, polyester resins, polyamide resins, epoxy resins, vinyl chloride resins such as vinyl chloride-vinyl acetate copolymer resin, fiber resins such as cellulose acetate butyrate, and vinyl toluene-α-methyl styrene copolymer resins. Among these resins, vinyl chloride resins are preferred; and vinyl chloride-vinyl acetate copolymer resin is more preferred. The composition containing such a resin has a tendency of further enhancing the abrasion resistance of the resulting recorded matter. These resins may be used alone or as a mixture of two or more thereof.

Examples of the vinyl chloride resin include, but not limited to, copolymer resins of vinyl chloride and one or more selected from the group consisting of vinyl acetate, vinylidene chloride, acryls, maleic acid, and vinyl alcohol. Among these copolymer resins, vinyl chloride-vinyl acetate copolymer resins of vinyl chloride and vinyl acetate are preferred; and vinyl chloride-vinyl acetate copolymer resins having a glass transition temperature of 60° C. or more and 80° C. or less are more preferred. The acryl is not particularly limited as long as the acryl is a compound that can copolymerize with vinyl chloride, and examples thereof include acrylic esters, such as methyl acrylate, ethyl acrylate, isopropyl acrylate, n-butyl acrylate, and 2-ethylhexyl acrylate; methacrylic esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxyl group-containing monomers, such as acrylic acid, methacrylic acid, maleic acid, fumaric acid, itaconic acid, mono-n-butyl maleate, mono-n-butyl fumarate, and mono-n-butyl itaconate; hydroxy group-containing (meth)acrylates; amide group-containing monomers; glycidyl group-containing monomers; cyano group-containing monomers; hydroxy group-containing allyl compounds; tertiary amino group-containing monomers; and alkoxysilyl group-containing monomers. These acryls may be used alone or in combination of two or more thereof.

The content of the resin is preferably 0.1% by mass or more and 10% by mass or less, more preferably 0.3% by mass or more and 5.0% by mass or less, and further preferably 0.5% by mass or more and 3.0% by mass or less based on the total amount (100% by mass) of the composition. The composition containing a resin within such an amount has a tendency of further enhancing the abrasion resistance.

The composition of the embodiment may further contain one or more optional components that can be used in known non-aqueous ink compositions for ink jet, in addition to the above-mentioned components. Examples of the optional component include coloring materials such as a dye, surfactants, penetrants, moisturizing agents, dissolution aids, viscosity modifiers, pH adjusters, antioxidants, preservatives, antifugal agents, corrosion inhibitors, chelating agents for capturing metal ions that influence dispersion, other additives, and solvents. These components may be each used alone or in combination.

Ink Jet Recording Method

The ink jet recording method of the embodiment includes a process of carrying out recording on a recording medium by an ink jet method using the above-described non-aqueous composition. Specifically, an image is recorded by discharging droplets of the non-aqueous composition and allowing the droplets to adhere to a recording medium, preferably, a low-absorbent recording medium.

In the present specification, the term "low-absorbent recording medium" refers to a recording medium that absorbs 10 mL/m$^2$ or less of water within 30 msec$^{1/2}$ from the start of contact with water when measured by a Bristow method. Such a property may be possessed by at least the recording surface. In this definition, examples of the "low-absorbent recording medium" in the present invention include non-absorbent recording media that do not absorb water at all. The Bristow method is most commonly used as a method for measuring the amount of liquid absorbed in a short period of time and is also employed by Japan Technical Association of the Pulp and Paper Industry (JAPAN TAPPI). The details of the test method are described in Standard No. 51 "Paper and Paperboard—Liquid Absorption Test Method—Bristow Method" in "JAPAN TAPPI Paper and Pulp Test Methods, 2000 Edition".

Examples of the low-absorbent recording medium include sheets, films, and fiber products containing low-absorbent materials. The low-absorbent recording medium may be composed of a base material (for example, paper, fiber, leather, plastic, glass, ceramics, or a metal) and a layer containing a low-absorbent material (hereinafter, also referred to as "low-absorbent layer") disposed on the surface of the base material. Examples of the low-absorbent material include, but not limited to, olefin resins, ester resins, urethane resins, acrylic resins, and vinyl chloride resins.

Among these media, a medium having a recording surface containing a vinyl chloride resin can be preferably used as the low-absorbent recording medium. Examples of the vinyl chloride resin include poly(vinyl chloride), vinyl chloride-ethylene copolymers, vinyl chloride-vinyl acetate copolymers, vinyl chloride-vinyl ether copolymers, vinyl chloride-vinylidene chloride copolymers, vinyl chloride-maleate copolymers, vinyl chloride-(meth)acrylic acid copolymers, vinyl chloride-(meth)acrylate copolymers, and vinyl chloride-urethane copolymers. The characteristics, such as thickness, shape, color, softening temperature, and hardness, of the low-absorbent recording medium are not particularly limited.

The non-aqueous composition of the embodiment having the above-described composition can have an advantageous effect of showing excellent intensity and abrasion resistance against, in particular, a low-absorbent recording medium, specifically, a recording medium containing a vinyl chloride resin. Accordingly, the ink jet recording method according to the embodiment can record images having further excellent intensity and abrasion resistance by allowing droplets of the non-aqueous composition to adhere to, in particular, a low-absorbent recording medium, specifically, a recording medium containing a vinyl chloride resin.

The ink jet recording method of the embodiment may be performed with any ink jet recording apparatus, and a drop-on-demand ink jet recording apparatus is preferred. Examples of the drop-on-demand ink jet recording apparatus include those employing a piezoelectric element recording method using piezoelectric elements disposed in recording heads and those employing a heat jet recording method using heat energy generated by, for example, heaters of heat-generating resistor elements disposed in recording heads. Any recording method can be employed for the ink jet recording apparatus. An example of the ink jet recording apparatus of the embodiment will now be described in further detail.

Ink Jet Recording Apparatus

The ink jet recording apparatus of the embodiment can use a known ink jet printer. For example, the ink jet printer (hereinafter, also simply referred to as "printer") shown in FIG. 1 can be used.

FIG. 1 is a perspective view illustrating the configuration of a printer 1 in the embodiment. As shown in FIG. 1, the printer 1 includes a carriage 4 on which an ink jet recording head 2 is mounted and an ink cartridge 3 is detachably installed; a platen 5 disposed below the ink jet recording head (ink jet head) 2 and onto which a recording medium 6 is transported; a carriage-moving mechanism 7 for moving the carriage 4 in the medium width direction (main scanning direction S) of the recording medium 6; and a medium-transporting mechanism 8 for transporting the recording medium 6 in the medium-transporting direction. The printer 1 also has a controller CONT that controls the entire operation of the printer 1.

The recording head 2 includes cavities for discharging the non-aqueous composition accommodated therein from nozzles; discharge-driving portions provided to the corresponding cavities and applying driving force for discharge to the non-aqueous composition; and nozzles provided to the corresponding cavities and discharging the non-aqueous composition to the outside of the head. One head may be provided with independently a plurality of each of the cavities and the discharge-driving portions and nozzles provided to the corresponding cavities. The discharge-driving portion can be formed using, for example, an electromechanical transducer, such as a piezoelectric element, that changes the volume of the cavity by mechanical deformation, or an electrothermal transducer that generates heat to form air bubbles in the non-aqueous composition and thereby discharges the non-aqueous composition. The printer 1 may include one head for one non-aqueous composition or may include a plurality of heads for one non-aqueous composition.

The ink cartridge 3 is composed of an independent plurality of cartridges, and each cartridge is filled with the non-aqueous composition. The cartridge filled with the non-aqueous composition cannot be mounted on the carriage 4 during ordinary printing and may be installed on the carriage 4 at least when the flow channel of the non-aqueous composition is rinsed.

The platen 5 includes a platen heater and is configured so as to heat the recording medium to a preset temperature. The recording head 2 does not have a built-in heater, but the temperature of the recording head is also increased as a result of heating of the recording medium, and thereby the temperature of the non-aqueous composition accommodated in the recording head 2 tends to raise. The printer 1 may include an after-heater (not shown) in the recording medium-transporting path downstream of the platen heater.

The above-described non-aqueous composition of the embodiment is discharged from the recording head 2. Herein, the temperature of the platen when the non-aqueous composition is discharged from the recording head 2 is preferably 35° C. or more and more preferably 40° C. or more, and is preferably 80° C. or less, more preferably 70° C. or less, further preferably 60° C. or less, and particularly preferably 50° C. or less. The platen heated with a platen heater to a temperature within the above-mentioned range is advantageous to provide higher quality to the recorded matter.

In addition, in the embodiment, the frequency of discharge from the recording head 2 is preferably 1.0 kHz or more and 200 kHz or less. A discharge frequency lower than the upper limit of the above-mentioned range is preferred to provide more excellent discharge stability, and a discharge frequency higher than the lower limit of the above-mentioned range is preferred to provide a higher recording speed. The term "discharge frequency" means the frequency of discharging each non-aqueous composition droplet as a discharge unit. The discharge frequency is preferably 2.0 kHz or more, more preferably 3.0 kHz or more, further preferably 5.0 kHz or more, and particularly preferably 10 kHz or more from the viewpoint of further accelerating the recording speed. In addition, the discharge frequency is preferably 200 kHz or less, more preferably 150 kHz or less, further preferably 100 kHz or less, and particularly preferably 50 kHz or less from the viewpoint of enhancing the discharge stability. Furthermore, the discharge frequency is preferably 20 kHz or less and more preferably 15 kHz or less from the viewpoint of providing further excellent discharge stability while maintaining the recording speed. At the same time, the discharge frequency is preferably 15 kHz or more and more preferably 20 kHz or more from the viewpoint of providing higher recording speed while maintaining the discharge stability.

In the printer 1 of the embodiment, the ink cartridge 3 is mounted on the carriage 4. That is, a so-called on-carriage type printer was described above as an example, but the present invention is not limited thereto. For example, the printer may be of a so-called off-carriage type, where an ink container (such as an ink pack or ink cartridge) filled with the non-aqueous composition is installed on, for example, the housing of the printer 1 and the non-aqueous composition is supplied to the head through an ink supply tube.

The ink jet recording apparatus of the embodiment can employ an ink set including a plurality of non-aqueous compositions. The ink set of the embodiment may include a plurality of the non-aqueous ink jet compositions of the embodiment or may further include one or more non-aqueous compositions (other non-aqueous composition(s)) different from the non-aqueous ink jet compositions of the embodiment. In such a case, the ink set may include the non-aqueous composition of the embodiment as a magenta ink and the other non-aqueous compositions as a yellow ink and a cyan ink. Alternatively, the ink set may include the non-aqueous composition of the embodiment as a red ink and the other non-aqueous compositions as a magenta ink, a yellow ink, and a cyan ink. From the viewpoint of achieving more excellent color reproducibility, the non-aqueous composition of the embodiment is preferably used as a red ink, and the other non-aqueous compositions are preferably used as magenta, yellow, and cyan inks.

EXAMPLES

The embodiment will now be more specifically described with reference to Examples and Comparative Examples, but is not limited to the following Examples and Comparative Examples, within the scope of the present invention.

The materials for the non-aqueous compositions used in the following Examples and Comparative Examples are mainly as follows.

Materials for Non-Aqueous Compositions
Pigment Red
  C.I. Pigment Red 254 (PR-254) (manufactured by Tokyo Chemical Industry Co., Ltd., trade name: Pigment Red Red 254)
  C.I. Pigment Red 177 (PR-177) (manufactured by Hangzhou Xcolor Chemical Company, trade name: Pigment Red Red 177)
  C.I. Pigment Red 179 (PR-179) (manufactured by Gaoyou Auxiliary Factory, trade name: Pigment Red Red 179)
  C.I. Pigment Red 224 (PR-224) (manufactured by Hangzhou Xcolor Chemical Company, trade name: Pigment Red Red 224) Organic solvent
  Diethylene glycol methyl ethyl ether (manufactured by Nippon Nyukazai Co., Ltd., trade name: MEDG)
  Diethylene glycol diethyl ether (manufactured by Nippon Nyukazai Co., Ltd., trade name: DEDG)
  Tetraethylene glycol dimethyl ether (manufactured by Tokyo Chemical Industry Co., Ltd., trade name: Tetraethylene Glycol Dimethyl Ether)
  Triethylene glycol monobutyl ether (manufactured by Tokyo Chemical Industry Co., Ltd., trade name: Triethylene Glycol Monobutyl Ether)
  Tetraethylene glycol monobutyl ether (manufactured by KH Neochem Co., Ltd., trade name: Butycenol 40)
  Dipropylene glycol monomethyl ether (manufactured by Tokyo Chemical Industry Co., Ltd., trade name: Dipropylene Glycol Monomethyl Ether)

Ethylene glycol monobutyl ether (manufactured by Tokyo Chemical Industry Co., Ltd., trade name: Ethylene Glycol Monobutyl Ether)

Heptaethylene Glycol Dimethyl Ether

Heptaethylene glycol monomethyl ether (manufactured by Tokyo Chemical Industry Co., Ltd., trade name: Heptaethylene Glycol Monomethyl Ether)

Gamma-butyrolactone (manufactured by Tokyo Chemical Industry Co., Ltd., trade name: γ-Butyrolactone)

Delta-valerolactone (manufactured by Tokyo Chemical Industry Co., Ltd., trade name: δ-Valerolactone) Resin Copolymer resin of vinyl chloride and vinyl acetate (manufactured by Nissin Chemical Co., Ltd., trade name: Solbin CL)

Pigment-dispersing Agent

Solsperse 37500 (trade name, manufactured by The Lubrizol Corporation)

Surfactant

BYK-340 (trade name, manufactured by BYK Chemie Japan K.K.)

Preparation of Non-aqueous Composition

The materials were mixed at the ratios shown in Tables 1 and 2 and were sufficiently stirred to give each composition. The unit of the numerical values in Tables 1 and 2 is % by mass, and the total is 100.0% by mass.

TABLE 1

| | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|---|---|---|---|
| PR-254 | 3.0 | 3.0 | 3.0 | 3.0 | 3.0 | 3.0 | 3.0 | 3.0 | 3.0 | 3.0 | 3.0 | 3.0 | 2.0 | 1.0 | 5.0 | 3.0 |
| PR-177 | — | — | — | — | — | — | — | — | — | — | — | — | — | — | — | — |
| PR-179 | — | — | — | — | — | — | — | — | — | — | — | — | — | — | — | — |
| PR-224 | — | — | — | — | — | — | — | — | — | — | — | — | — | — | — | — |
| Diethylene glycol ethyl methyl ether | 50 | 74 | — | — | 50 | 50 | 50 | 50 | 55 | 30 | 34 | 25 | 55 | 51 | 47 | 50 |
| Diethylene glycol diethyl ether | — | — | 50 | — | — | — | — | — | — | — | — | — | — | — | — | — |
| Tetraethylene glycol dimethyl ether | — | — | — | 50 | — | — | — | — | — | — | — | — | — | — | — | — |
| Triethylene glycol monobutyl ether | 34 | 10 | 34 | 34 | — | — | — | 34 | 34 | 34 | 50 | 25 | 35 | 35 | 35 | 34 |
| Tetraethylene glycol monobutyl ether | — | — | — | — | 34 | — | — | — | — | — | — | — | — | — | — | — |
| Dipropylene glycol monomethyl ether | — | — | — | — | — | 34 | — | — | — | — | — | — | — | — | — | — |
| Ethylene glycol monobutyl ether | — | — | — | — | — | — | 34 | — | — | — | — | — | — | — | — | — |
| Heptaethylene glycol dimethyl ether | — | — | — | — | — | — | — | — | — | — | — | — | 14 | — | — | 10 |
| Heptaethylene glycol monomethyl ether | — | — | — | — | — | — | — | — | — | — | — | — | — | — | — | — |
| Gamma-butyrolactone | 10 | 10 | 10 | 10 | 10 | 10 | 10 | — | 5.0 | 30 | 10 | 30 | 5.0 | 10 | 10 | — |
| Delta-valerolactone | — | — | — | — | — | — | — | 10 | — | — | — | — | — | — | — | — |
| Solbin CL | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Solsperse 37500 | 1.9 | 1.9 | 1.9 | 1.9 | 1.9 | 1.9 | 1.9 | 1.9 | 1.9 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Abrasion resistance | 4 | 4 | 4 | 4 | 4 | 4 | 4 | 4 | 3 | 4 | 4 | 4 | 4 | 4 | 3 | 3 |
| Intensity | 4 | 4 | 4 | 4 | 4 | 4 | 4 | 4 | 4 | 3 | 3 | 3 | 3 | 3 | 4 | 4 |
| Discharge stability | 4 | 4 | 4 | 3 | 4 | 4 | 3 | 4 | 4 | 3 | 3 | 3 | 4 | 4 | 3 | 3 |

TABLE 2

| | Example 17 | Example 18 | Example 19 | Example 20 | Example 21 | Example 22 | Comparative example 1 | Comparative example 2 |
|---|---|---|---|---|---|---|---|---|
| PR-254 | 3.0 | 3.0 | 3.0 | 1.0 | 0.5 | 6.0 | — | — |
| PR-177 | — | — | — | — | — | — | 3.0 | — |
| PR-179 | — | — | — | — | — | — | — | 3.0 |
| PR-224 | — | — | — | — | — | — | — | — |
| Diethylene glycol ethyl methyl ether | 56 | 25 | 20 | 46 | 50 | 50 | 50 | 50 |
| Diethylene glycol diethyl ether | — | — | — | — | — | — | — | — |
| Tetraethylene glycol dimethyl ether | — | — | — | — | — | — | — | — |
| Triethylene glycol monobutyl ether | 34 | 34 | 20 | 45 | 36.5 | 31 | 34 | 34 |
| Tetraethylene glycol monobutyl ether | — | — | — | — | — | — | — | — |
| Dipropylene glycol monomethyl ether | — | — | — | — | — | — | — | — |
| Ethylene glycol monobutyl ether | — | — | — | — | — | — | — | — |
| Heptaethylene glycol dimethyl ether | — | — | 44 | — | — | — | — | — |
| Heptaethylene glycol monomethyl ether | — | — | — | — | — | — | — | — |
| Gamma-butyrolactone | 4.0 | 35 | 10 | 5.0 | 10 | 10 | 10 | 10 |
| Delta-valerolactone | — | — | — | — | — | — | — | — |
| Solbin CL | 1.0 | 1.0 | 1.0 | 1.0 | 1.0 | 1.0 | 1.0 | 1.0 |

TABLE 2-continued

|  |  |  |  |  |  |  |  |  |
|---|---|---|---|---|---|---|---|---|
| Solsperse 37500 | 1.9 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 | 0.1 |
| Abrasion resistance | 3 | 4 | 4 | 4 | 4 | 3 | 4 | 4 |
| Intensity | 4 | 3 | 3 | 3 | 3 | 4 | 2 | 1 |
| Discharge stability | 3 | 2 | 2 | 3 | 3 | 2 | 4 | 4 |

|  | Comparative example 3 | Comparative example 4 | Comparative example 5 | Comparative example 6 | Comparative example 7 | Comparative example 8 | Comparative example 9 |
|---|---|---|---|---|---|---|---|
| PR-254 | — | 3.0 | 3.0 | 3.0 | — | — | — |
| PR-177 | — | — | — | — | 3.0 | 3.0 | 3.0 |
| PR-179 | — | — | — | — | — | — | — |
| PR-224 | 3.0 | — | — | — | — | — | — |
| Diethylene glycol ethyl methyl ether | 50 | — | 84 | — | — | 84 | — |
| Diethylene glycol diethyl ether | — | — | — | — | — | — | — |
| Tetraethylene glycol dimethyl ether | — | — | — | — | — | — | — |
| Triethylene glycol monobutyl ether | 34 | 84 | — | — | 84 | — | — |
| Tetraethylene glycol monobutyl ether | — | — | — | — | — | — | — |
| Dipropylene glycol monomethyl ether | — | — | — | — | — | — | — |
| Ethylene glycol monobutyl ether | — | — | — | — | — | — | — |
| Heptaethylene glycol dimethyl ether | — | — | — | 84 | — | — | 84 |
| Heptaethylene glycol monomethyl ether | — | — | — | — | — | — | — |
| Gamma-butyrolactone | 10 | 10 | 10 | 10 | 10 | 10 | 10 |
| Delta-valerolactone | — | — | — | — | — | — | — |
| Solbin CL | 1.0 | 1.0 | 1.0 | 1.0 | 1.0 | 1.0 | 1.0 |
| Solsperse 37500 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 |
| Abrasion resistance | 4 | 3 | 4 | 4 | 3 | 4 | 4 |
| Intensity | 2 | 2 | 2 | 1 | 1 | 1 | 1 |
| Discharge stability | 4 | 1 | 2 | 1 | 1 | 2 | 1 |

Formation of Recording Matter

A PVC medium (manufactured by 3M Company, Model No. IJ180-10) as a recording medium was placed in an ink jet printer (manufactured by Seiko Epson Corporation, trade name: SC-S30650); any of the compositions prepared in Examples and Comparative Examples was loaded into the discharge head; the temperature of the platen was maintained at 45° C. during the formation of a recorded matter and for 1 minute after the formation of the recorded matter; and a solid pattern was formed at an application amount targeted to 10 mg/inch$^2$ and a resolution of 720×720 dpi to give each recorded matter. Even if partial deficiency in the discharge was caused by a discharge defect, the defective portion was not compensated.

Evaluation 1: Abrasion Resistance

Each of the resulting recorded matters was rubbed with an abrader having a cotton cloth (unbleached muslin: No. 20) under a load of 500 g with a Gakushin-type rubbing fastness tester (manufactured by Tester Sangyo Co., Ltd., trade name: AB-301) for 20 times in a reciprocating motion in accordance with JIS K5701 (ISO 11628). Abrasion resistance was evaluated by visually observing the recorded matter on the recording medium for scratch and detachment based on the following evaluation criteria. The results are shown in Tables 1 and 2.

Evaluation Criteria

4: No scratch and no detachment were observed in the recorded matter after the rubbing for 20 times in a reciprocating motion;

3: No detachment was observed in the recorded matter after rubbing for 20 times in a reciprocating motion, but scratch was observed;

2: Detachment and scratch were partially observed in the recorded matter after rubbing for 20 times in a reciprocating motion; and 1: Detachment was observed in the recorded matter over a part after rubbing for 20 times in a reciprocating motion.

Evaluation 2: Image Quality (Intensity)

The intensity (C*) of each of the resulting recorded matters was evaluated. Specifically, the value a* and the value b* of each of the resulting recorded matters were measured with a spectrophotometer (manufactured by GretagMacbeth, trade name: Spectrolino), and the value C* was calculated. The intensity was evaluated based on the following evaluation criteria. The calculated value C* was rounded off to the nearest whole number. The results are shown in Tables 1 and 2.

Evaluation Criteria

4: value C* of 100 or more,
3: value C* of 90 to 99,
2: value C* of 80 to 89, and
1: value C* of 79 or less.

Evaluation 3: Discharge Stability

Any of the compositions prepared in Examples and Comparative Examples was loaded to an ink jet printer (manufactured by Seiko Epson Corporation, trade name: SC-S30650). Subsequently, the composition was discharged from an ink jet head having 360 nozzles at a frequency of 7 kHz to continuously form solid patterns on PVC media (manufactured by 3M Company, Model No. IJ180-10) as recording media for 300 seconds (L dot, 600×600 dpi), and the discharge was then stopped. This procedure was defined as one sequence. The procedure was repeated ten sequences. The thus-prepared solid patterns as recorded matters were investigated for dot omission, curved flight, and scattering of the ink. The nozzle having these phenomena was defined as a defective nozzle, and the ratio of defective nozzles to the total nozzles was counted for evaluating discharge stability. The results are shown in Tables 1 and 2. After the evaluation, the surface of the filter mounted on the head was observed to confirm that aggregation was caused in proportion to the rate of defective nozzles. This demonstrates that the cause of discharge defect is aggregation. The aggregation was mainly composed of pigments.

Evaluation Criteria

4: defective nozzle rate of 0%,

3: defective nozzle rate of higher than 0% and less than 5.0%,

2: defective nozzle rate of 5.0% or more and less than 10%, and

1: defective nozzle rate of 10% or more.

The comparison between the results of Examples and Comparative Examples shown in Tables 1 and 2 demonstrates that the non-aqueous ink jet compositions according to the present invention can form recorded matters having excellent abrasion resistance and intensity and further demonstrates that the non-aqueous ink jet compositions also have excellent discharge stability.

The entire disclosure of Japanese Patent Application No. 2016-013520, filed Jan. 27, 2016 is expressly incorporated by reference herein.

What is claimed is:

1. A non-aqueous ink jet composition comprising:
a pigment containing a diketopyrrolopyrrole red pigment; and
an organic solvent containing a glycol diether represented by Formula (1) and a glycol monoether represented by Formula (2):

$$R^1O-(R^3O)_m-R^2 \qquad (1)$$

wherein, $R^1$ and $R^2$ each independently represent an alkyl group having 1 to 7 carbon atoms, $R^3$ represents an alkylene group having 1 to 3 carbon atoms, and m represents an integer of 1 to 7, $$OH-(R^5O)_n-R^4 \qquad (2)$$

wherein, $R^4$ represents an alkyl group having 1 to 7 carbon atoms, $R^5$ represents an alkylene group having 1 to 3 carbon atoms, and n represents an integer of 1 to 7, and wherein a content of the glycol diether represented by Formula (1) is 5.0% by mass or more and 90% by mass or less based on the total amount of the non-aqueous ink jet composition, a content of the glycol monoether represented by Formula (2) is 5% by mass or more and 80% by mass or less based on the total amount of the non-aqueous ink jet composition, and a total content of the glycol diether represented by Formula (1) and the glycol monoether represented by Formula (2) is 30% by mass or more and 99.5% by mass or less based on the total amount of the non-aqueous ink jet composition.

2. The non-aqueous ink jet composition according to claim 1, wherein
the organic solvent further contains a cyclic lactone.

3. The non-aqueous ink jet composition according to claim 2, wherein
the cyclic lactone is contained in an amount of 5.0% by mass or more and 30% by mass or less based on the total amount of the non-aqueous ink jet composition.

4. The non-aqueous ink jet composition according to claim 1, wherein
the pigment is contained in an amount of 1.0% by mass or more and 5.0% by mass or less based on the total amount of the non-aqueous ink jet composition.

5. The non-aqueous ink jet composition according to claim 1, wherein
the organic solvent is contained in an amount of 50% by mass or more and 90% by mass or less based on the total amount of the non-aqueous ink jet composition.

6. The non-aqueous ink jet composition according to claim 1 further comprising a vinyl chloride resin.

7. An ink jet recording method comprising:
performing recording on a recording medium by an ink jet method using the non-aqueous ink jet composition according to claim 1.

8. An ink jet recording method comprising:
performing recording on a recording medium by an ink jet method using the non-aqueous ink jet composition according to claim 2.

9. An ink jet recording method comprising:
performing recording on a recording medium by an ink jet method using the non-aqueous ink jet composition according to claim 3.

10. An ink jet recording method comprising:
performing recording on a recording medium by an ink jet method using the non-aqueous ink jet composition according to claim 4.

11. An ink jet recording method comprising:
performing recording on a recording medium by an ink jet method using the non-aqueous ink jet composition according to claim 5.

12. An ink jet recording method comprising:
performing recording on a recording medium by an ink jet method using the non-aqueous ink jet composition according to claim 6.

13. The non-aqueous ink jet composition according to claim 1, wherein the glycol monoether is selected from the group consisting of ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

14. The non-aqueous ink jet composition according to claim 1, wherein in the glycol monoether represented by Formula (2), $R^4$ represents one selected from the group consisting of a methyl, an ethyl, a propyl, a butyl, a pentyl, a hexyl, and a heptyl, $R^5$ represents one selected from the group consisting of methylene, ethylene, and propylene, and n represents an integer of 1 to 7.

* * * * *